(12) United States Patent
Brown et al.

(10) Patent No.: US 8,670,111 B1
(45) Date of Patent: Mar. 11, 2014

(54) FIBER MONITORING APPARATUS AND SYSTEM FOR DETECTING AN OPTICAL FIBER THERMAL EVENT

(75) Inventors: Aaron Brown, Vancouver, WA (US); Cary S. Kiest, Albany, OR (US); Mitchell R. Reynolds, Vancouver, WA (US); Raymond Sohn, Beaverton, OR (US)

(73) Assignee: nLIGHT Photonics Corporation, Vancouver, WA (US)

( * ) Notice: Subject to any disclaimer, the term of this patent is extended or adjusted under 35 U.S.C. 154(b) by 168 days.

(21) Appl. No.: 13/485,191

(22) Filed: May 31, 2012

(51) Int. Cl.
*G01N 21/00* (2006.01)

(52) U.S. Cl.
USPC .......................................................... 356/73.1

(58) Field of Classification Search
USPC .......................................................... 356/73.1
See application file for complete search history.

(56) References Cited

U.S. PATENT DOCUMENTS

| 4,476,512 A | 10/1984 | Sunago et al. |
| 4,812,641 A * | 3/1989 | Ortiz Jr. .................. 250/205 |
| 5,012,087 A | 4/1991 | Rockstroh et al. |

\* cited by examiner

*Primary Examiner* — Tarifur Chowdhury
*Assistant Examiner* — Omar Nixon
(74) *Attorney, Agent, or Firm* — Ethan A. McGrath; John R. Flanagan

(57) ABSTRACT

A fiber monitoring system for detecting the occurrence of a thermal event, especially of a traumatic nature, in optical fibers while transmitting laser beams includes one or more fiber monitoring apparatuses each having a thermal sensing array supported by a holder board of a laminated dielectric material having a row of clips for retaining optical fibers in alignment with thermal sensor devices of the thermal sensing arrays. The thermal sensing arrays also have electrical circuitry elements for electrically interconnecting the thermal sensing devices in series and enabling electrically connecting the thermal sensing arrays with other circuitry to form a thermal interlock circuit for a laser system.

32 Claims, 7 Drawing Sheets

FIBER MONITORING APPARATUS AND SYSTEM FOR DETECTING AN OPTICAL FIBER THERMAL EVENT

BACKGROUND OF THE INVENTION

1. Field of the Invention

Generally, the field of the present invention is optical fiber management. More particularly, the present invention relates to a fiber monitoring apparatus and system for detecting the occurrence of a thermal event, especially of a traumatic nature, in an optical fiber while transmitting a laser beam.

2. Background Art

Optical fibers are widely employed in transmitting laser beams from lasers to end uses in diverse applications. An optical fiber is typically composed of a central core surrounded by a concentric cladding. Ideally, during its transmission a laser beam is completely contained in the central core by total internal reflection due to slight differences in the indices of refraction of the material of the core and cladding. Typical material, such as fused silica, used to form the core and cladding is susceptible to developing defects, particularly cracks or fractures, shortening the useful life of the optical fiber. At times these defects may evolve into a failure of the optical fiber that can have deleterious consequences.

One such consequence is where an optical fiber failure is sufficient to provoke the occurrence of a thermal event, especially of a traumatic nature, in an optical fiber transmitting a high power laser beam, having the potential to create a fire hazard, because the laser continues to operate. The optical fiber could burn back towards the laser like a fuse at very high temperature and ignite flammable components in the vicinity of the burning fiber. If the fiber is left to burn back to the laser, the laser might also be damaged.

The potential hazard of optical fiber failure has been generally recognized for many years, and various approaches to finding solutions to this problem have been proposed. One approach is to provide an optical fiber with a breakage sensor which takes the form of a fragile wire that is embedded within the jacket of the fiber such that when an event (whether thermal or mechanical) occurs that breaks the wire, a circuit opens and an interlock may be triggered to shut off the laser. A similar approach disclosed in U.S. Pat. No. 5,012,087, which issued in 1991 to Rockstroh et al., proposes to place a second optical fiber together with the laser power transmitting fiber in a jacketing tube or conduit encompassing both such that laser energy leaking from a damaged portion of the laser power transmitting fiber will cause failure of the second optical fiber which in turn would operate to shut off power to the laser before the jacketing conduit is adversely affected. However, both these approaches are deficient in that they would likely require significant added costs in order to initially provide each fiber with a companion failure sensing component of substantially the same length and then later have to provide replacement of both the damaged failure sensing component and the fiber.

Another approach disclosed in U.S. Pat. No. 4,476,512, which issued in 1984 to Sunago et al., proposes to position heat-sensitive elements near the input and output ends and the center of the optical fiber. These elements will produce signals that are processed by a detector circuit to indicate an abnormal increase or decrease in laser power at the center of the fiber for detecting a damaged fiber or abnormal laser light source. However, the disclosure of this approach is deficient in that no details are provided in this patent instructing what device or technique might be used to deploy the heat-sensitive elements relative to the fiber. Thus, further significant development efforts and innovative problem solving would likely be needed to determine the effectiveness of this approach.

Thus, in view of the deficiencies of the foregoing approaches, it is apparent that there still remains a long-felt pressing need for an innovation that provides an effective solution to the problem of an optical fiber failure potentially having deleterious consequences.

SUMMARY OF THE INVENTION

The present invention is directed to an innovation that mitigates the potential deleterious consequences of the occurrence of a thermal event, especially of a traumatic nature, created by an optical fiber failure. This innovation derives from the recognition by the inventors herein that fiber-retaining clips of a pre-existing prior art metal fiber clip assembly, as identified hereinafter in reference to FIG. 8, in providing the desired management of the location of optical fibers can concurrently serve to maintain the fibers in desired alignments with thermal sensor devices if the latter are supported by the metal fiber clip assembly in close proximity to its fiber-retaining clips and the optical fibers.

Accordingly, in one aspect, the present invention provides a monitoring apparatus for detecting the occurrence of a thermal event in an optical fiber transmitting a laser beam. The monitoring apparatus includes a holder body and a thermal sensing array. The holder body has a first portion with a plurality of retention elements thereon each arranged next to another and configured to receive and hold an optical fiber such that the optical fibers extend along paths passing through the retention elements and in opposite directions from the holder body, and a second portion adjacent to the first portion with a plurality of attachment elements thereon configured for assisting the mounting of the holder body on a support structure. The thermal sensing array includes a plurality of thermal sensor devices each supported by the second portion of the holder body adjacent to the first portion of the holder body and adjacent to and aligned with the path of at least one of the optical fibers so as to enable the thermal sensor devices to detect changes in temperature corresponding to the occurrence of thermal events in the optical fibers while transmitting laser beams, and a plurality of electrical circuitry elements supported by the second portion of the holder body so as to electrically interconnect the thermal sensor devices in a series relationship.

In another aspect, the present invention provides a monitoring system for detecting the occurrence of a thermal event in an optical fiber transmitting a laser beam. The monitoring system includes a plurality of monitoring apparatuses each including a holder board and a thermal sensing array. The holder board is made of a non-conductive material and has a first portion with a plurality of retention elements thereon each arranged next to another in a row and configured to receive and hold an optical fiber such that the optical fibers extend along paths passing through the retention elements of and in opposite directions from the holder board. The holder board also has a second portion adjacent to the first portion with a plurality of attachment elements thereon configured for assisting the mounting of the holder board on a support structure. The thermal sensor array includes a plurality of thermal sensor devices each supported by the second portion of the holder board adjacent to the first portion of the holder board and adjacent to and aligned with the path of at least one of the optical fibers so as to enable the thermal sensor devices to detect changes in temperature corresponding to the occurrence of thermal events in the optical fibers while transmitting laser beams. The thermal sensing array also includes a plurality of electrical circuitry elements supported by the second portion of the holder board so as to electrically interconnect the thermal sensor devices in a series relationship. The monitoring system also includes electrical wiring extending between the thermal sensing arrays of the monitoring apparatuses and connected to selected ones of the electrical circuitry elements of the monitoring apparatuses for electrically interconnecting the apparatuses of each sub-pluralities thereof in a series relationship and also electrically interconnecting the sub-pluralities of the apparatuses in a parallel relationship for enabling their electrical connection to other circuitry to form a thermal interlock circuit for a laser system.

The foregoing and other objects, features, and advantages will become more apparent from the following detailed description, which proceeds with reference to the accompanying figures.

DETAILED DESCRIPTION OF THE INVENTION

Figure 1:
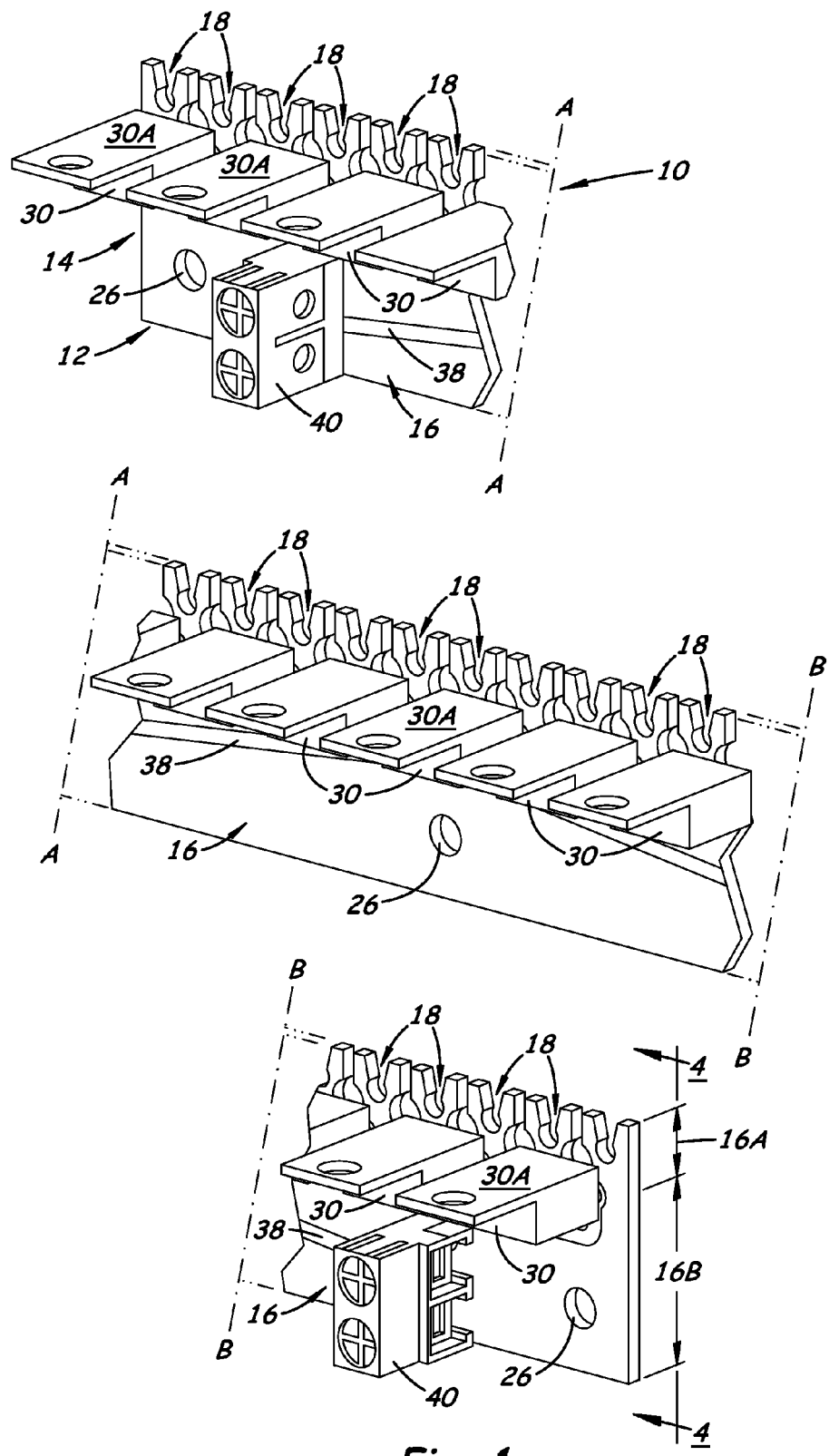
FIG. 1 is a perspective view, in a slightly foreshortened form, of a basic version of a first exemplary embodiment of a fiber monitoring apparatus, in accordance with an aspect of the present invention.

Referring now to FIGS. 1-4, there is shown a basic version of a first exemplary embodiment of the fiber monitoring apparatus, generally designated 10, in accordance with an aspect of the present invention. The fiber monitoring apparatus 10 includes a holder body 12 for managing and positioning a plurality of optical fibers F (see FIGS. 3, 4 and 7) and a thermal sensing array 14 supported by the holder body 12 relative to the optical fibers for detecting changes in temperature corresponding to the occurrence of a thermal event in the optical fibers while transmitting a laser beam.

More particularly, in the first embodiment the holder body 12 is the form of a holder board 16 made from any non-conductive suitably stiff material that is adapted to be use in this environment and to reliably perform a desired support or holding function with respect to the optical fibers F and the thermal sensing array 14. By way of example but not limitation, one commercially available material that is suitable for the task is a laminated dielectric material, such as used in construction of printed circuit boards. Also, the board is adapted to be self-extinguishing or non-flammable due to incorporation of a suitable fire-retardant material.

Figure 2:
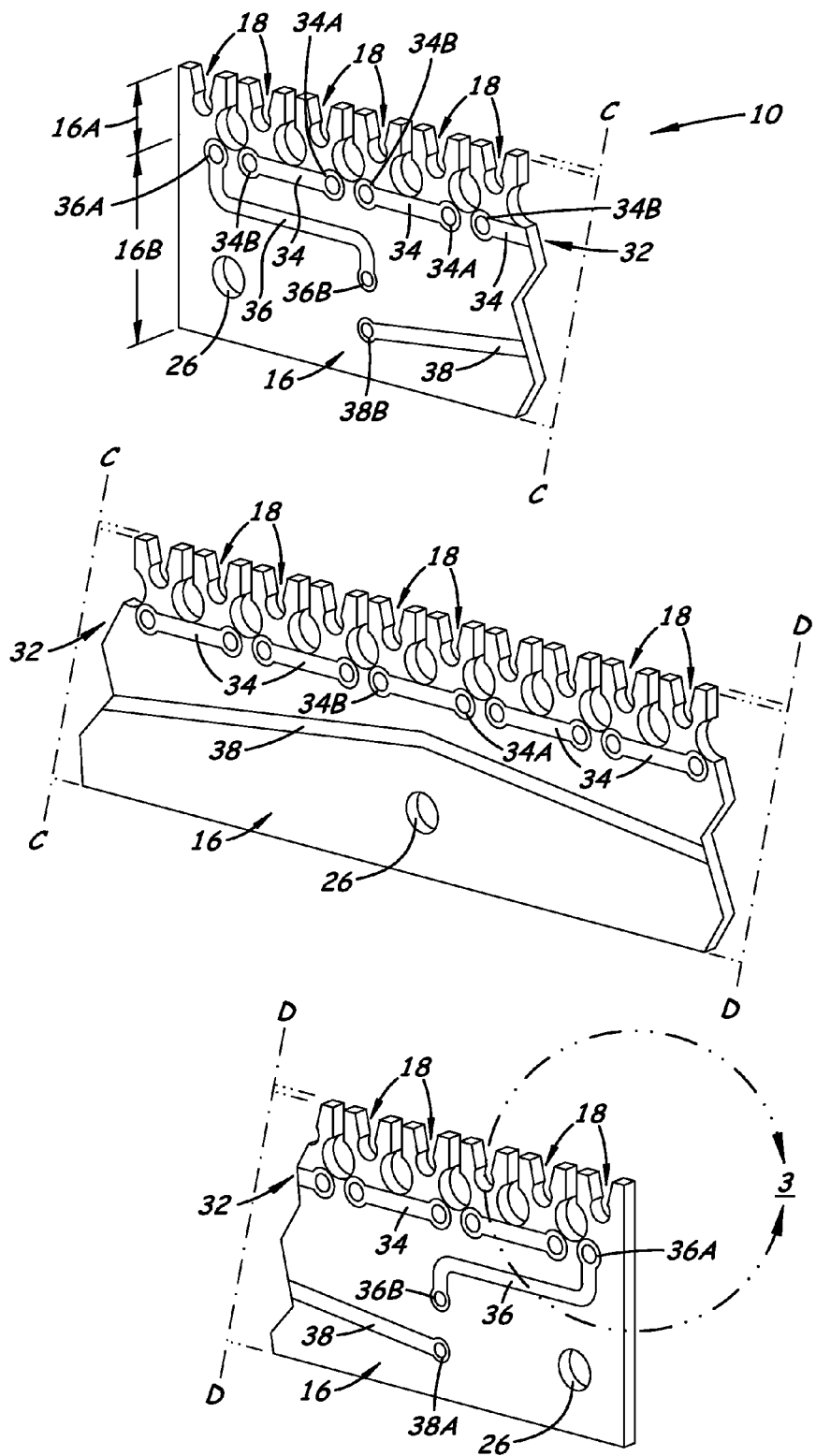
FIG. 2 is a perspective view, in a slightly foreshortened form, of a holder board of the fiber monitoring apparatus of FIG. 1 with some of the components of a thermal sensing array of the apparatus shown mounted on the holder board.
Figure 3:
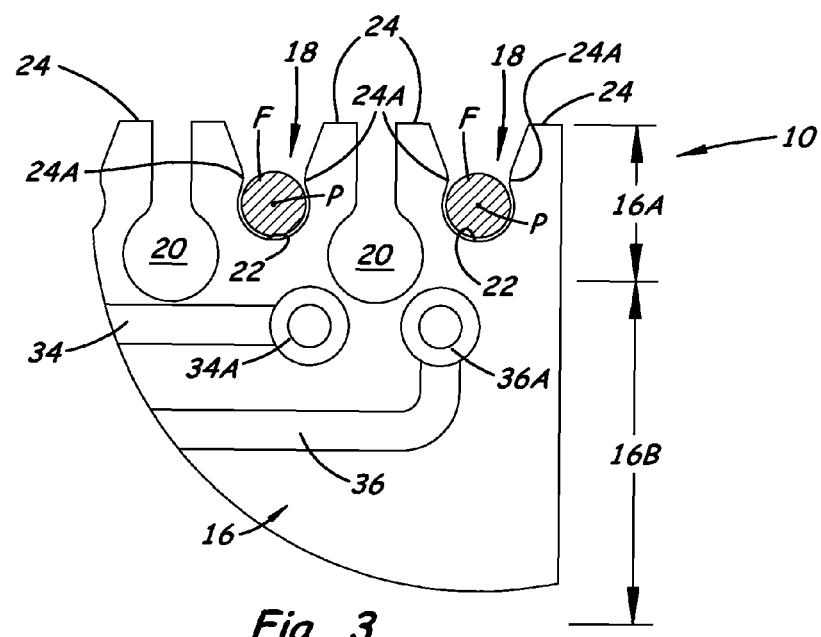
FIG. 3 is an enlarged elevational view of a fragmentary end portion of the holder panel encompassed by circle 3-3 in FIG. 2.

As seen in FIGS. 1-3, the holder board 16 has a first, or upper, portion 16A and a second, or lower, portion 16B. The first portion 16A of the board 16 is provided with a plurality of retention elements in the form of upwardly-open clips 18 formed in a row in the board 16. The clips 18 are each arranged next to another and configured to receive and hold an optical fiber F such that the optical fibers extend along paths P passing through the clips 18 and in opposite directions from the board 16. By using well-known fabrication techniques spaced areas of board material arranged in a staggered relationship with one another and of two different alternating shapes along the first portion 16A of the board 16 are removed and thereby leave a series of voids 20, 22 in the upper portion 16A that define fiber-retaining clips 18 between them and, in particular, define the shapes of a pair of opposing side legs 24 of each of the clips 18. The voids 20, 22 provide sufficient space between and within the clips 18 to allow adjacent side legs 24 of adjacent clips 18 to be squeezed together and thereby flex slightly toward one another enough to allow one optical fiber F to be inserted between opposing inwardly protruding surfaces 24A on the interiors of side legs 24 of each clip 18 and thus received in the voids 22 where the fibers will be retained by the clips 18 after the adjacent side legs 24 are released.

The second portion 16B of the holder board 16 is located adjacent to and below the first portion 16A of the board 16. The second portion 16B is provided with a plurality of spaced apart attachment elements, such as in the form of apertures 26, which are made in the second portion 16B of the board 16 using well-known fabrication techniques in configurations for enabling the mounting of the board 16 on a support structure, such as the sheet metal surface of a housing or the like, by the use of at least one mounting brackets 28, such as the one shown in FIGS. 4 and 6.

Figure 4:
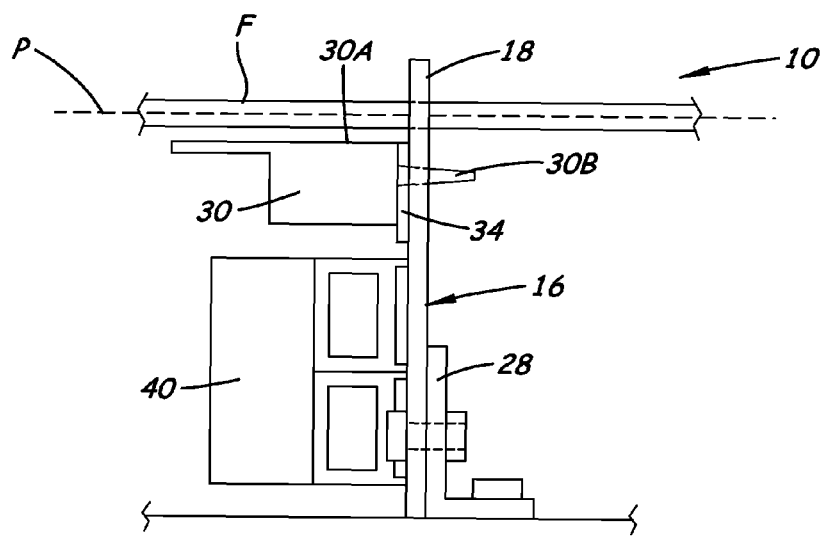
FIG. 4 is an end elevational view of the fiber monitoring apparatus taken along line 4-4 of FIG. 1.

As seen in FIGS. 1, 2 and 4, the thermal sensing array 14 includes a plurality of thermal sensor devices 30 and a plurality of electrical circuitry elements, generally designated 32, all also supported by the second portion 16B of the holder board 16. The thermal sensor devices 30 are supported adjacent to and below the first portion 16A where they are positioned adjacent to and aligned with the paths P of the optical fibers F so as to enable the thermal sensor devices 30 to detect changes in temperature corresponding to the occurrence of thermal events in the optical fibers F while transmitting laser beams. The thermal sensor devices 30 may either be spaced from or make contact with the optical fibers such that each thermal sensor device 30 is capable of detecting the temperature of the adjacent optical fibers F by sensing the temperature of the optical fibers or of the ambient air around the adjacent optical fibers through a top plate 30A on the thermal sensing device 30. When the thermal sensor device 30 experiences a change or increase in temperature that corresponds to the occurrence of a traumatic thermal event in the optical fiber, the device 30 switches to an open circuit state which via external circuitry connected to the thermal sensing array 14 shuts off the laser. By way of example but not limitation, one commercially available component that is suitable for performing the task of the thermal sensor device 30 is an Airpax™ 6700 Series, TO-220 Bimetal Disc Thermostat marketed by Sensata Technologies Inc., which is a positive snap action, single pole/single throw, sub-miniature bimetallic thermostat which provides accurate and reliable sensing and switching in a single component. One simple way to determine which of the thermal sensor devices 30 opened is to perform a continuity check across each of the devices 30. The continuity check may be quickly performed across a pair of spaced apart electrically-conductive terminals 30B.

Figure 6:
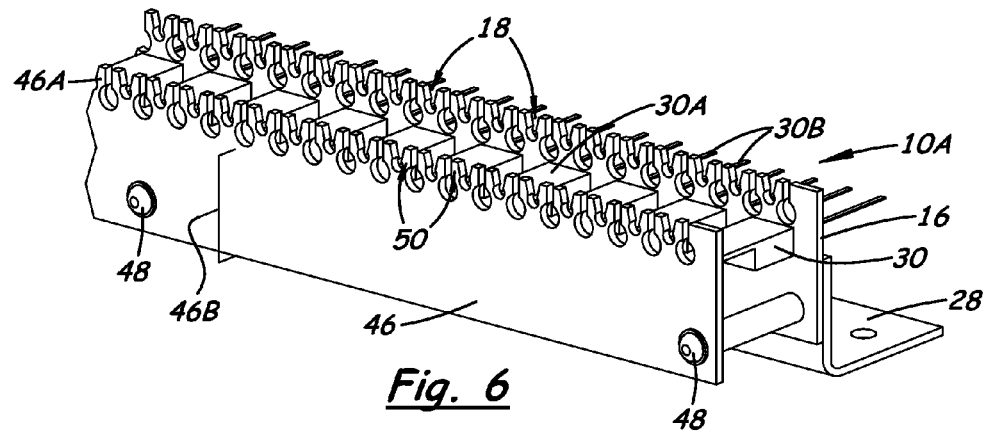
FIG. 6 is a perspective view of slightly more than one-half the length of an enhanced version of the first exemplary embodiment of fiber monitoring apparatus of FIG. 1.
Figure 7:
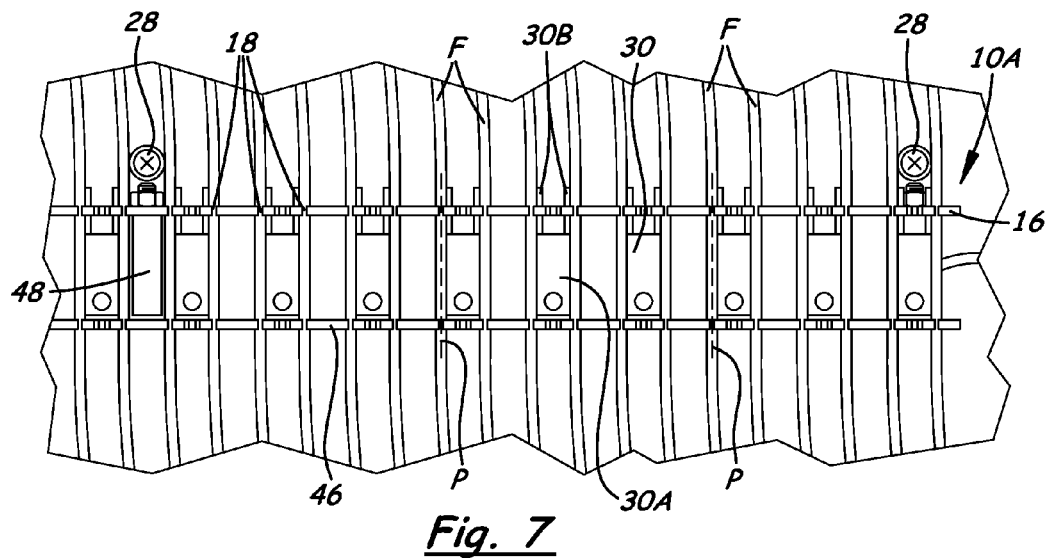
FIG. 7 is a top plan view of the enhanced version of the fiber monitoring apparatus of FIG. 6.

As can be readily understood from considering FIGS. 1 and 2 together, the plurality of electrical circuitry elements 32 are provided to electrically interconnect the thermal sensor devices 30 in a series relationship and also for enabling the thermal sensing array 14 to be electrically connected in series with other circuitry to enable forming a thermal interlock circuit for a laser system. The electrical circuitry elements 32 include a plurality of first circuit traces 34, a pair of second circuit traces 36, a third circuit trace 38 and a pair of wiring adapters 40. The first circuit traces 34 are applied on the second portion 16B of the holder board 16 adjacent to one another in a row spaced below the clips 18 on the first portion 16A of the board 16. Each first circuit trace 34 has a pair of opposite ends 34A, 34B with one of the opposite ends 34A being spaced apart from an adjacent one of the opposite ends 34B of an adjacent one of first circuit traces 34. As best seen in FIGS. 6 and 7, each of the thermal sensor devices 30 at its spaced apart electrically-conductive terminals 30B is adapted to mount to and extend through the board 16 and make electrical contact with the spaced apart adjacent opposite ends 34A, 34B of one pair of the first circuit traces 34 adjacent to the thermal sensor device 30.

The second circuit traces 36 are applied on the second portion 16B of the holder board 16 at one of a pair of opposite ends of the row of first circuit traces 34. Each second circuit trace 36 has a pair of opposite ends 36A, 36B with one opposite end 36A spaced from and adjacent to an opposite end 34B of one of the first circuit traces 34 at one of the pair of opposite ends of the row of first circuit traces 34. The terminals 30B of each of the thermal sensor devices 30 at one of the opposite ends of the row of first circuit traces 34 is in electrical contact with one of the opposite ends 36A of one of the second circuit traces 36 and the adjacent one of opposite ends 34B of one of the first traces 34 at one of the opposite ends of the row of first circuit traces 34.

The third circuit trace 38 is applied on the second portion 16B of the holder board 16 below the row of first circuit traces 34. The third circuit trace 38 has a pair of opposite ends 38A, 38B each spaced from and adjacent to one of the opposite ends 36B of one of pair of second circuit traces 36. Each of the pair of wiring adapters 40 is mounted to the second portion 16B of the board 16 at one of the opposite ends 38A, 38B of the third circuit trace 38. Each wiring adapter 40 is electrically connected to one of the opposite ends 38A or 38B of the third circuit trace 38 and an adjacent one of the opposite ends 36B of one of the pair of second circuit traces 36 for enabling the thermal sensing array 14 to be electrically connected in series with other circuitry to form the thermal interlock circuit for the laser system.

Figure 5:
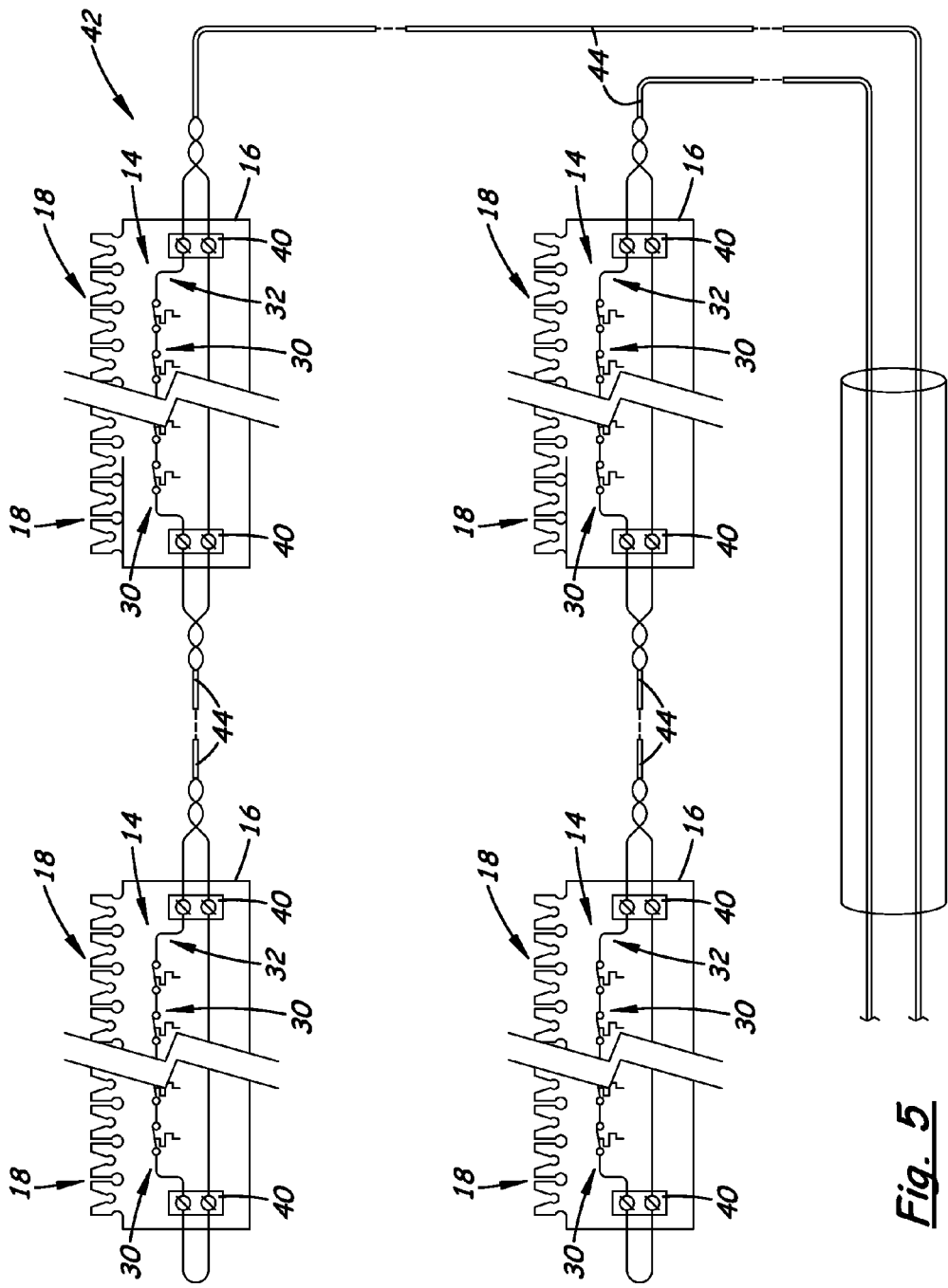
FIG. 5 is a schematic view of an exemplary embodiment of a fiber monitoring system, in accordance with another aspect of the present invention.

Referring now to FIG. 5, there is shown schematically an exemplary embodiment of a fiber monitoring system, generally designated 42, in accordance with another aspect of the present invention. The fiber monitoring system 42 may encompass a plurality of the basic version of the first exemplary embodiment of the fiber monitoring apparatuses 10, as described heretofore in reference to FIGS. 1-4, with the thermal sensing arrays 14 on the holder boards 16 being electrically interconnected in a series relationship. Alternately, the fiber monitoring system 42 may encompass a plurality of the enhanced version of the first exemplary embodiment of the fiber monitoring apparatuses 10A, as will be described hereinafter in reference to FIGS. 6 and 7 or a plurality of the second exemplary embodiment of the fiber monitoring apparatuses 10B, as will be described hereinafter in reference to FIGS. 8-10. The fiber monitoring system 42 includes electrical wiring 44 extending between the thermal sensing arrays of the monitoring apparatuses 10, 10A or 10B and connected to the wiring adapters of the monitoring apparatuses 10, 10A or 10B for electrically interconnecting the apparatuses of each sub-pluralities thereof in a series relationship and also electrically interconnecting the sub-pluralities of the apparatuses in a parallel relationship for enabling their electrical connection to other circuitry to form a thermal interlock circuit for a laser system.

Referring now to FIGS. 6 and 7, there is shown an enhanced version of the first exemplary embodiment of the fiber monitoring apparatus, generally designated 10A, in accordance with another aspect of the present invention. This enhanced version of the fiber monitoring apparatus 10A incorporates the basic version of the fiber monitoring apparatus 10 described hereinbefore in reference to FIGS. 1-4; thus, the same parts in both versions are identified with the same reference numbers and need not be described in detail again. The only difference between the two versions is that the enhanced version of the fiber monitoring apparatus 10A has a supplemental board 46 and a plurality of spacer elements 48 disposed between and interconnecting the holder and supplemental boards 16, 46 to one another. The supplemental board 46 does not provide any additional support to the thermal sensor devices 30 and plurality of electrical circuit elements 32 of the thermal sensing array supported by the holder board 16. The supplemental board 46 has a first portion 46A with a plurality of retention elements defined thereon in the form of the row of upwardly-open clips 50 which are constructed in the same way and have the same configuration as the clips 18 on the holder board 16. The supplemental board 46 also has a second portion 46B adjacent to and below the first portion 46A. The spacer elements 48 are disposed between and interconnect the second portions 16B, 46B of the holder and supplemental boards 16, 46. The supplement board 46 is not mounted on the support structure separately or independently of the holder board 16. The presence of the supplemental board 46 further enhances the stability, proximity and consistency of the positioning and alignment of the fibers relative to the thermal sensor devices. The supplemental board 46 may be made of the same material as in the holder board 16 and likewise may be adapted to be self-extinguishing due to incorporation of a suitable fire-retardant material.

Figure 8:
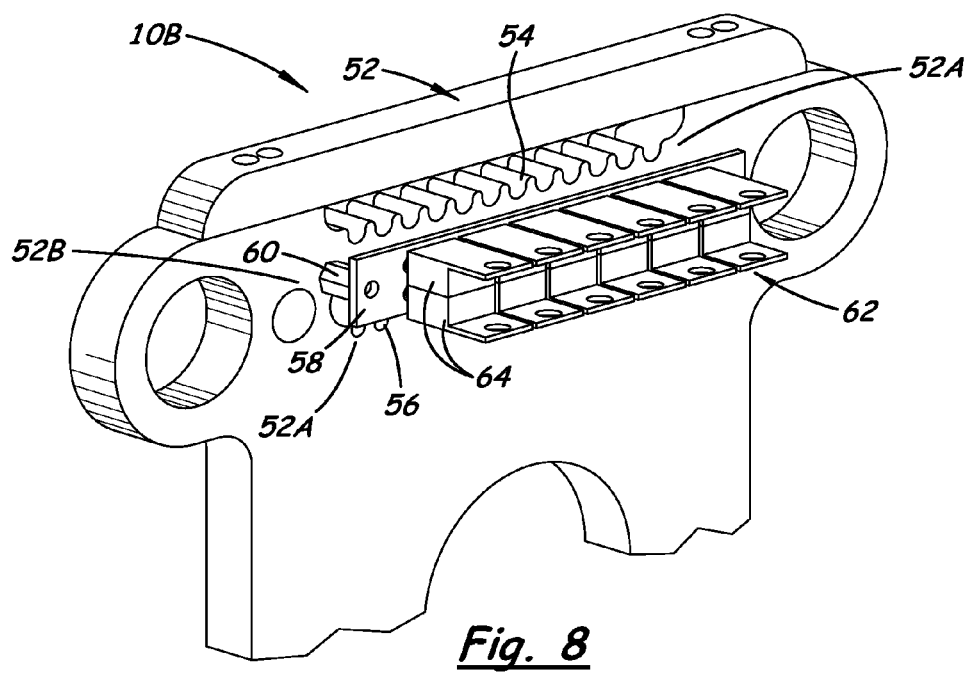
FIG. 8 is a perspective view of a second exemplary embodiment of the fiber monitoring apparatus in accordance with another aspect of the present invention.
Figure 9:
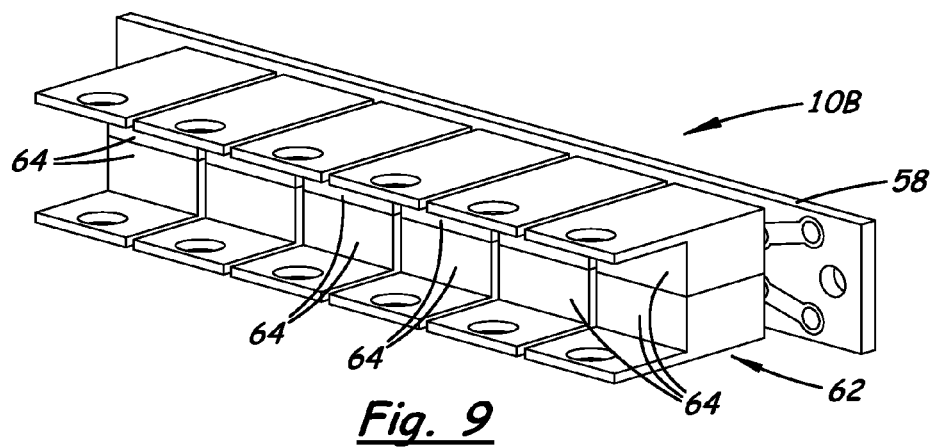
FIG. 9 is a perspective view of a thermal sensing array of the fiber monitoring apparatus of FIG. 8.
Figure 10:
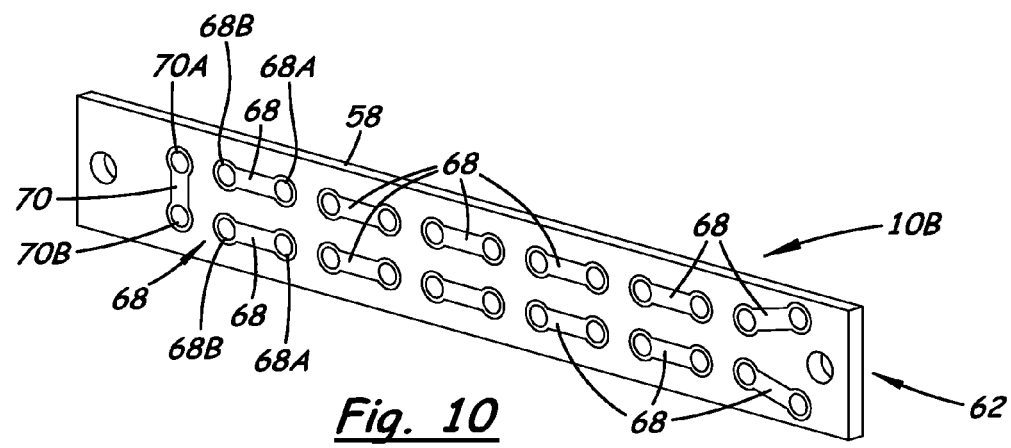
FIG. 10 is a perspective view of a board of the thermal sensing array of FIG. 9 with some of the other components of the thermal sensing array shown mounted on the board.

Referring now to FIGS. 8-10, there is shown a second exemplary embodiment of the fiber monitoring apparatus, generally designated 10B, in accordance with another aspect of the present invention. As seen in FIG. 8, the fiber monitoring apparatus 10B includes a holder body 52 for managing and positioning a plurality of optical fibers F (now shown) in upper and lower rows of fiber-retaining clips 54, 56 formed on the holder body 52. The holder body 52 itself (with its upper and lower rows of clips 54, 56) is a pre-existing prior art component made of metal. The holder body 52 has first portions 52A spaced apart from one another, and above and below one another, and a second portion 52B located between the spaced apart first portions 52A.

In accordance with the present invention, in addition the holder body 52 of the fiber monitoring apparatus 10B now includes a board 58, made of the same material and having the same properties as the holder board 16 of the basic and enhanced versions of the first exemplary embodiment of the apparatuses 10, 10A, and a plurality of connector elements 60 mounting the board 58 to the second portion 52B of the holder body 52. The fiber monitoring apparatus 10B also includes a thermal sensing array 62 having a plurality of the thermal sensor devices 64 supported by the board 58 on the holder body 52. The thermal sensor devices 64 are the same as the ones employed in the apparatuses 10, 10A and described hereinbefore. The thermal sensing array 62 is supported by the board 58 such that its thermal sensor devices 64 are spaced apart from one another, but now also arranged in two rows at two levels, above and below one another, such that the upper thermal sensor devices 64 are aligned with paths of optical fibers passing above them while the lower thermal sensor devices 64 are in an inverted relation to the upper thermal sensor devices 64 and aligned with paths of optical fibers passing below them. In such manner, the pluralities of thermal sensor devices 64 are disposed in operative alignments with the paths of optical fibers (not shown) above and below the thermal sensing array 62 for detecting changes in temperature corresponding to the occurrence of a thermal event in the optical fibers while transmitting laser beams.

As seen in FIG. 10, the thermal sensing array 62 also includes a plurality of electrical circuitry elements 66 which interconnects the upper and lower thermal sensor devices 64 in a series relation. The plurality of electrical circuitry elements 66 include a plurality of first circuit traces 68 applied on the board 58 adjacent to one another in upper and lower rows spaced below and above the upper and lower clips 54, 56 on the first portions 52A of the holder body 52, and a second circuit trace 70 applied on the board 58 adjacent to the leftmost ends of the upper and lower rows of the first circuit traces 68. The first circuit traces 68 have respective pairs of opposite ends 68A, 68B. The spaced apart adjacent ends 68A, 68B of adjacent thermal sensor devices 64 are adapted to make electrical contact with the terminals of the thermal sensor devices 64 when the latter are installed and mounted on the board 58 in the same way as described hereinbefore. The second circuit trace 70 has upper and lower opposite ends 70A, 70B which match with the ends 68B of the leftmost first circuit traces 68 in the upper and lower rows thereof. The two leftmost thermal sensor devices 64 make electrical contact with these matched pairs of first circuit traces 68 and second circuit trace 70 such that the upper and lower rows of thermal sensor devices 64 are electrically connected in a series relation. A wiring adapter 40 (see FIG. 1) can be mounted to the board 58 across the ends 68A of the rightmost two first circuit traces 68 for enabling the thermal sensing array 62 to be electrically connected in series with other circuitry to form a thermal interlock circuit for a laser system.

It is thought that the present invention and many of the attendant advantages thereof will be understood from the foregoing description and it will be apparent that various changes may be made in the parts thereof without departing from the spirit and scope of the invention or sacrificing all of its material advantages, the forms hereinbefore described being merely exemplary embodiments thereof.

What is claimed is:
1. A fiber monitoring apparatus, comprising:
a holder body having
 a first portion with a plurality of retention elements thereon each arranged next to another and configured to receive and hold an optical fiber such that the optical fibers extend along paths passing through said retention elements and in opposite directions from said holder body, and
 a second portion adjacent to said first portion with a plurality of attachment elements thereon configured for enabling the mounting of said holder body on a support structure; and a thermal sensing array including
 a plurality of thermal sensor devices each supported by said second portion of said holder body adjacent to said first portion of said holder body and adjacent to and aligned with the path of at least one of the optical fibers so as to enable said thermal sensor devices to detect changes in temperature corresponding to the occurrence of thermal events in the optical fibers while transmitting laser beams, and
 a plurality of electrical circuitry elements supported by said second portion of said holder body so as to electrically interconnect said thermal sensor devices in a series relationship.

2. The apparatus of claim 1, wherein said holder body includes a board made of a non-conductive material, located at said second portion of said holder body and supporting said thermal sensing array.

3. The apparatus of claim 2, wherein said holder body also includes a plurality of connector elements mounting said board to said second portion of said holder body.

4. The apparatus of claim 2, wherein said holder body includes another first portion, said first portions spaced apart from one another and above and below one another so as to provide said retention elements in upper and lower rows thereof, said second portion of said holder body being located between said spaced apart first portions.

5. The apparatus of claim 4, wherein said thermal sensing array is supported by said board such that said thermal sensor devices are spaced apart from one another and arranged as upper and lower rows of thermal sensor devices at two levels, above and below one another, said upper row of thermal sensor devices are aligned with paths of optical fibers passing above said upper row of thermal sensor devices while said lower row of thermal sensor devices are in an inverted relation to said upper row of thermal sensor devices and aligned with paths of optical fibers passing below said lower row of thermal sensor devices.

6. The apparatus of claim 5, wherein said electrical circuitry elements include a plurality of first circuit traces applied on said board adjacent to one another in upper and lower rows spaced below and above said upper and lower retention elements on said first portions of said holder body, said upper row of first circuit traces for electrically interconnecting said thermal sensor devices in said upper row thereof, said lower row of first circuit traces for electrically interconnecting said thermal sensor devices in said lower row thereof.

7. The apparatus of claim 6, wherein said thermal sensor devices have pairs of spaced apart electrically-conductive terminals adapted to mount to said board in electrical contact with spaced apart adjacent opposite ends of adjacent pairs of said circuit traces.

8. The apparatus of claim 7, wherein said electrical circuitry elements also include a second circuit trace applied on said board adjacent corresponding one ends of said upper and lower rows of first circuit traces, said second circuit trace having upper and lower opposite ends matching ends of said upper and lower first circuit traces at said one ends of said upper and lower rows thereof for electrically interconnecting said thermal sensor device at one end of said upper row thereof with said thermal sensor device at one end of said lower row thereof such that said upper and lower rows of thermal sensor devices are electrically connected in a series relation.

9. The apparatus of claim 8, wherein said electrical circuitry elements further include a wiring adapter mounted to said board and electrically connected to ends of said first circuit traces at corresponding other ends of said upper and lower rows of first circuit traces for enabling said thermal sensing array to be electrically connected in series with other circuitry to form a thermal interlock circuit for a laser system.

10. The apparatus of claim 1, wherein each of said thermal sensor devices is a bimetal disc thermostat.

11. The apparatus of claim 1, wherein said holder body is a board made of a non-conductive fire-retardant material.

12. The apparatus of claim 11, wherein said retention elements are upwardly-open clips formed in a row in said first portion of said board.

13. The apparatus of claim 11, wherein said attachments are apertures formed in said second portion of said board.

14. A fiber monitoring apparatus, comprising:
   a holder board made of a non-conductive material and having
      a first portion with a plurality of retention elements thereon each arranged next to another in a row and configured to receive and hold an optical fiber such that the optical fibers extend along paths passing through said retention elements of and in opposite directions from said holder board, and
      a second portion adjacent to said first portion with a plurality of attachment elements thereon configured for enabling the mounting of said holder board on a support structure; and
   a thermal sensing array including
      a plurality of thermal sensor devices each supported by said second portion of said holder board adjacent to said first portion of said holder board and adjacent to and aligned with the path of at least one of the optical fibers so as to enable said thermal sensor devices to detect changes in temperature corresponding to the occurrence of thermal events in the optical fibers while transmitting laser beams, and
      a plurality of electrical circuitry elements supported by said second portion of said holder board so as to electrically interconnect said thermal sensor devices in a series relationship.

15. The apparatus of claim 14, wherein said electrical circuitry elements include a plurality of first circuit traces applied on said holder board adjacent to one another in a row spaced below said retention elements on said first portion of said holder board, each of said first circuit traces having a pair of opposite ends with one of said opposite ends being spaced apart from an adjacent one of said opposite ends of an adjacent one of said first circuit traces.

16. The apparatus of claim 15, wherein each of said thermal sensor devices has a pair of spaced apart electrically-conductive terminals adapted to mount to said holder board in electrical contact with said spaced apart adjacent opposite ends of one pair of said first circuit traces adjacent to said thermal sensor device.

17. The apparatus of claim 16, wherein said electrical circuitry elements also include a pair of second circuit traces applied on said holder board, each of said second circuit traces having a pair of opposite ends with one opposite end spaced from and adjacent to an opposite end of one of said first circuit traces at one of a pair of opposite ends of said row of first circuit traces, said terminals of each of said thermal sensor devices at one of said opposite ends of said row of first circuit traces being in electrical contact with one of said opposite ends of one of said second circuit traces and an adjacent one of said opposite ends of one of said first traces at said one of said opposite ends of said row of first circuit traces.

18. The apparatus of claim 17, wherein said electrical circuitry elements further include a third circuit trace applied on said holder board and having a pair of opposite ends each spaced from and adjacent to one of said opposite ends of one of said pair of second circuit traces.

19. The apparatus of claim 18, wherein said electrical circuitry elements further include a pair of wiring adapters mounted to said board each electrically connected to one of said opposite ends of said third circuit trace and an adjacent one of said opposite ends of one of said pair of second circuit traces for enabling said thermal sensing array to be electrically connected in series with other circuitry to form a thermal interlock circuit for a laser system.

20. The apparatus of claim 14, wherein each of said thermal sensor devices is a bimetal disc thermostat.

21. The apparatus of claim 14, wherein said retention elements are upwardly-open clips formed in a row in said first portion of said holder board.

22. The apparatus of claim 14, wherein said attachments are apertures formed in said second portion of said holder board.

23. The apparatus of claim 14, further comprising:
   a supplemental board having
      a first portion with a plurality of retention elements thereon each arranged next to another in a row, aligned with one of said retention elements formed in said holder board and configured to receive and hold the optical fiber along paths passing through said retention elements of and in opposite directions from said holder and auxiliary boards, and
      a second portion adjacent to and below the said first portion.

24. The apparatus of claim 23, further comprising:
   a plurality of connector elements disposed between and interconnecting said holder and supplemental boards to one another at said second portions thereof.

25. The apparatus of claim 23, wherein said supplemental board is made of a non-conductive fire-retardant material.

26. A fiber monitoring system, comprising:
   a plurality of monitoring apparatuses, each monitoring apparatus including
      a holder board made of a non-conductive material and having
         a first portion with a plurality of retention elements thereon each arranged next to another in a row and configured to receive and hold an optical fiber such that the optical fibers extend along paths passing through said retention elements of and in opposite directions from said holder board, and
         a second portion adjacent to said first portion with a plurality of attachment elements thereon configured for enabling the mounting of said holder board on a support structure; and
      a thermal sensing array including
         a plurality of thermal sensor devices each supported by said second portion of said holder board adjacent to said first portion of said holder board and adjacent to and aligned with the path of at least one of the optical fibers so as to enable said thermal sensor devices to detect changes in temperature corresponding to the occurrence of thermal events in the optical fibers while transmitting laser beams, and
         a plurality of electrical circuitry elements supported by said second portion of said holder board so as to electrically interconnect said thermal sensing devices in a series relationship; and
   electrical wiring extending between said thermal sensing arrays of said plurality of monitoring apparatuses and connected to selected ones of said electrical circuitry elements of said monitoring apparatuses for electrically interconnecting the apparatuses of each sub-pluralities thereof in a series relationship and also electrically interconnecting the sub-pluralities of the apparatuses in a parallel relationship for enabling their electrical connection to other circuitry to form a thermal interlock circuit for a laser system.

27. The system of claim 26 wherein said electrical circuitry elements of each thermal sensing array include a plurality of first circuit traces applied on said holder board adjacent to one another in a row spaced below said retention elements on said first portion of said holder board, each of said first circuit traces having a pair of opposite ends with one of said opposite ends being spaced apart from an adjacent one of said opposite ends of an adjacent one of said first circuit traces.

28. The system of claim 27, wherein each of said thermal sensor devices of each thermal sensing array has a pair of spaced apart electrically-conductive terminals adapted to mount to said holder board in electrical contact with said spaced apart adjacent opposite ends of one pair of said first circuit traces adjacent to said thermal sensor device.

29. The system of claim 28, wherein said electrical circuitry elements of each thermal sensing array also include a pair of second circuit traces applied on said holder board, each of said second circuit traces having a pair of opposite ends with one opposite end spaced from and adjacent to an opposite end of one of said first circuit traces at one of a pair of opposite ends of said row of first circuit traces, said terminals of each of said thermal sensor devices at one of said opposite ends of said row of first circuit traces being in electrical contact with one of said opposite ends of one of said second circuit traces and an adjacent one of said opposite ends of one of said first traces at said one of said opposite ends of said row of first circuit traces.

30. The system of claim 29, wherein said electrical circuitry elements of each thermal sensing array further include a third circuit trace applied on said holder board and having a pair of opposite ends each spaced from and adjacent to one of said opposite ends of one of said pair of second circuit traces.

31. The system of claim 30, wherein said electrical circuitry elements of each thermal sensing array further include a pair of wiring adapters mounted to said board each electrically connected to one of said opposite ends of said third circuit trace and an adjacent one of said opposite ends of one of said pair of second circuit traces for enabling said thermal sensing array to be electrically interconnected in series with other thermal sensing arrays.

32. The system of claim 26, wherein said holder board also incorporates a fire-retardant material.

* * * * *